United States Patent [19]

Taguchi

[11] Patent Number: 5,757,426
[45] Date of Patent: May 26, 1998

[54] PHOTOELECTRIC CONVERTER OUTPUT PROCESSING SYSTEM FOR PROVIDING RELIABLE OUTPUT AMPLIFICATION

[75] Inventor: Fumiya Taguchi, Yokohama, Japan

[73] Assignee: Nikon Corporation, Tokyo, Japan

[21] Appl. No.: 374,073

[22] Filed: Jan. 19, 1995

[30] Foreign Application Priority Data

Feb. 4, 1994 [JP] Japan .................. 6-012823

[51] Int. Cl.[6] .................. H04N 5/217; H04N 9/64
[52] U.S. Cl. .................. 348/243; 348/241; 348/250; 348/313; 250/208.1; 257/223
[58] Field of Search .................. 348/207, 222, 348/241, 243, 294, 300, 301, 307, 308, 244, 245, 251, 373; 250/208.1; 257/223, 229, 239; H04N 5/217, 9/64

[56] References Cited

U.S. PATENT DOCUMENTS

| | | | |
|---|---|---|---|
| 4,553,169 | 11/1985 | Yoshioka et al. | 358/221 |
| 4,677,490 | 6/1987 | Levine | 348/250 |
| 4,875,098 | 10/1989 | Yamamoto et al. | 348/250 |
| 4,916,307 | 4/1990 | Nishibe et al. | 250/214 C |
| 4,980,768 | 12/1990 | Stehle et al. | 358/213.16 |
| 5,162,912 | 11/1992 | Ueno et al. | 358/213.16 |
| 5,311,320 | 5/1994 | Hashimoto | 348/243 |
| 5,389,971 | 2/1995 | Ishida et al. | 348/294 |
| 5,396,280 | 3/1995 | Caiozza et al. | 348/126 |
| 5,473,660 | 12/1995 | Bastiaens et al. | 378/98.8 |
| 5,539,457 | 7/1996 | Tsunai | 348/241 |

*Primary Examiner*—Andrew Faile
*Assistant Examiner*—Ngoe-Yen Vu
*Attorney, Agent, or Firm*—Oliff & Berridge, PLC

[57] ABSTRACT

A photoelectric converter output processing system includes a photoelectric converter for converting light signals into electric output signals, a voltage storage device capable of storing a reference voltage, a voltage supply device that supplies a preset voltage, a control device that selectively couples the voltage supply device to the voltage storage device so that the voltage storage device is charged to the reference voltage when the photoelectric converter is generating one of the electric output signals and a reset reference signal, and an amplifier coupled to the photoelectric converter and the voltage storage device. The amplifier amplifies the photoelectric converter electric output signals based on the reference voltage stored in the voltage storage device. Thus, reliable CCD output amplification is achieved, starting with the first effective CCD sensor output cycle.

20 Claims, 8 Drawing Sheets

PHOTOELECTRIC CONVERTER OUTPUT PROCESSING SYSTEM FOR PROVIDING RELIABLE OUTPUT AMPLIFICATION

BACKGROUND OF THE INVENTION

1. Field of the Invention

This invention generally relates to photoelectric converter output processing devices.

2. Description of Related Art

A charged coupled device (CCD) line sensor is conventionally used in applications such as, for example, camera focusing and photometry. The CCD line sensor can be comprised of an array of sensors arranged in a line where each sensor generates data representing one picture element or pixel. The signal of each sensor represents the intensity of light sensed by that sensor. Normally, portions of the CCD are protected from external light by using aluminum shields. These aluminum shields cover the ends of the CCD so that several pixels at the ends of the CCD are dark. The current output from these particular pixels are known as "dark current output." The pixels that are not shielded are called effective pixels.

Since the current values output from the dark pixels represent no light, the current from the effective pixels are at higher values. The dark current output values are all nearly equal. Thus, the dark current output values represent an offset value that can be subtracted from the current values of the effective pixels. Since the CCD output signals are amplified by an amplifier, this offset value prevents the utilization of the full dynamic range of the output amplifier. In order to fully utilize the output amplifier dynamic range, this offset value is subtracted from the current output values of the effective CCD sensors, or otherwise used in the amplification process.

Conventionally, the current outputs from the CCD sensor elements are converted to voltage values. The offset value is removed from all the effective CCD sensor outputs by using a voltage corresponding to the dark current outputs as a reference voltage during amplification of the CCD output voltages. A capacitor of a sample hold circuit is set to the reference voltage by sampling the voltages corresponding to the dark current outputs of selected dark pixels.

Figure 10:
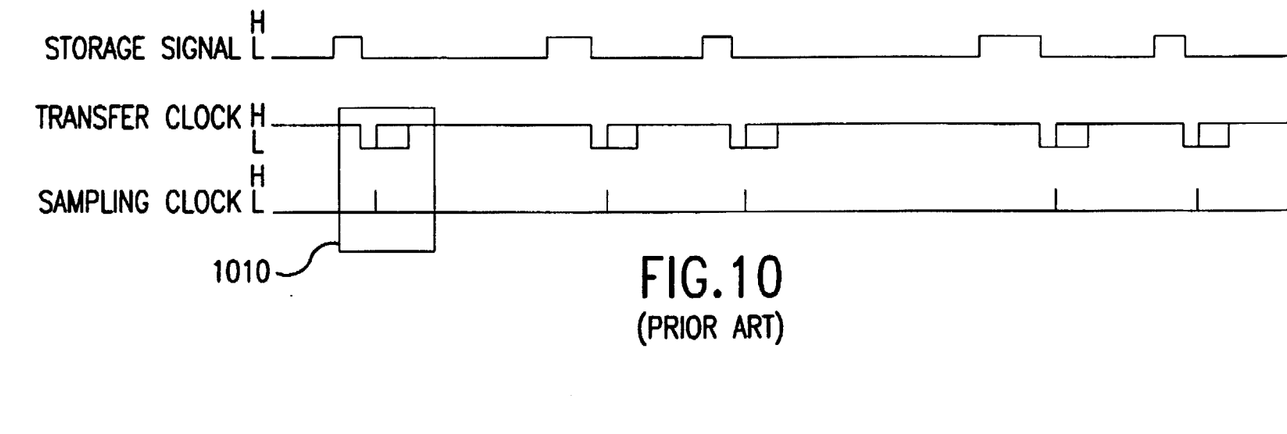
FIG. 10 is a timing chart showing the transfer clocks and sampling signals of the conventional system relative to each CCD cycle.
Figure 11:
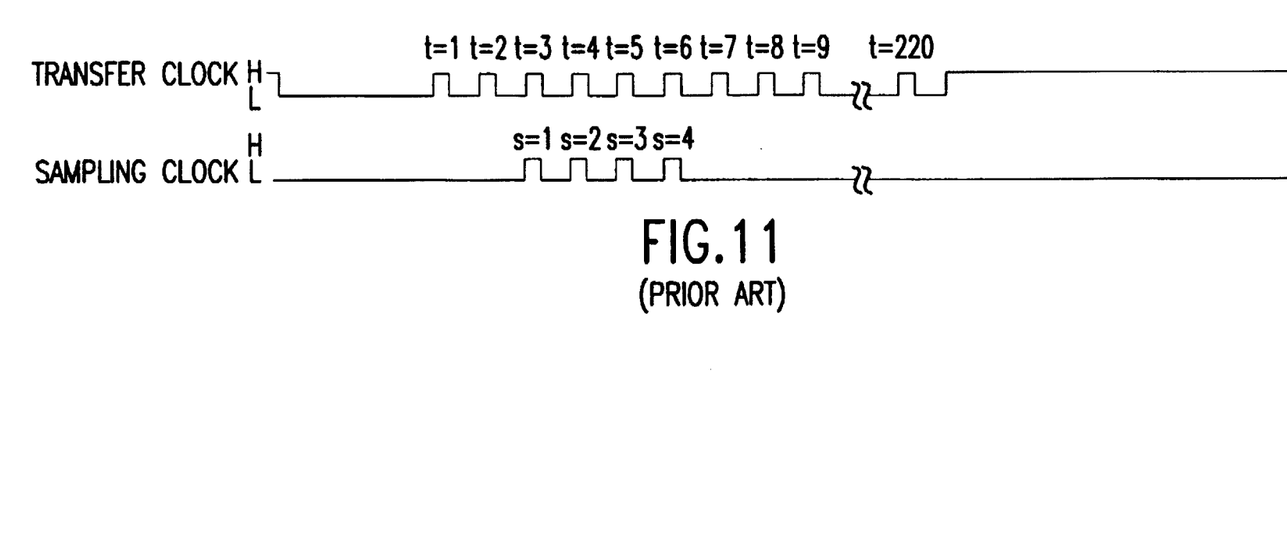
FIG. 11 is an expanded view of a portion of FIG. 9.

FIG. 10 shows an example of waveforms of a storage signal, a CCD line sensor transfer clock and a sample hold circuit sampling clock. Each time the storage signal becomes HIGH, the CCD is activated and stores data based on light received by the CCD. The block 1010 is expanded in FIG. 11 showing that there are 220 transfer clocks, t=1 through t=220, corresponding to 220 sensors in the CCD. For this example, nine pixels at each end of the CCD line sensor are dark pixels. The sample clocks, s=1 through s=4 select the outputs of dark pixels 3 through 6 for use in setting the reference voltage.

Normally, a sample hold capacitor leaks current so that over time, error in the reference voltage is introduced as the voltage of the capacitor decreases. In order to reduce this error, larger capacitor values are used. However, large capacitor values introduce other undesirable factors. A larger capacitor requires a longer sampling time to sample a voltage value. Also, since a larger current is required to charge a larger capacitor, the ON resistance of the sampling switch prevents accurate capture of the reference voltage.

When the sampling time is insufficient for the capacitor to reach the reference voltage corresponding to the dark current output, several sampling cycles may be required for the capacitor to reach the proper reference voltage value. This results in the first few sets (or cycles) of the effective CCD sensor outputs being unreliable. This error is not correctable even if a microcomputer is used because all computations are based on the CCD outputs.

Figure 9:
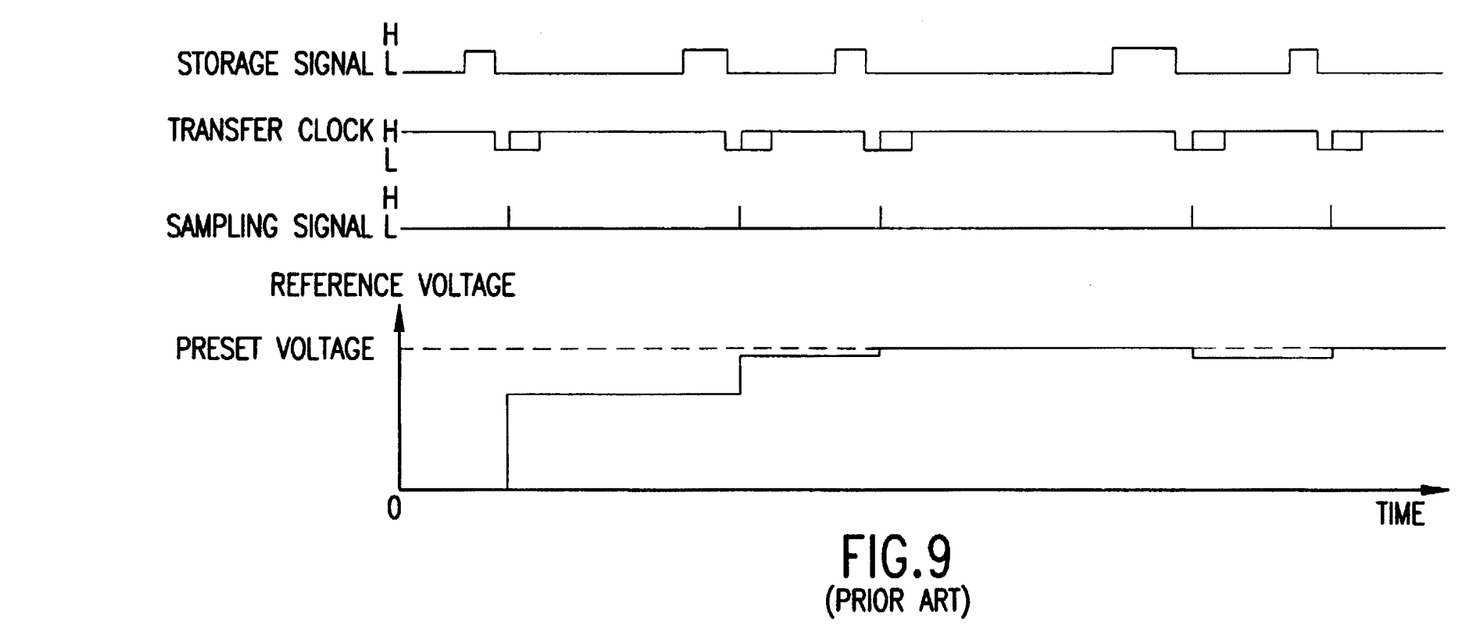
FIG. 9 is a waveform diagram of the reference voltage of a conventional system relative to each CCD cycle.

FIG. 9 shows an example of a waveform of a prior art reference voltage. Since the sample hold capacitor is large and not pre-charged, the starting voltage of the sample hold capacitor is near zero volts. Thus, it may require several cycles of sampling signals to charge the sample hold capacitor to the required voltage value. The sampling signals occur only when the CCD is outputting signals. The sample hold capacitor is not charged prior to the occurrence of the first CCD outputs. Accordingly, the conventional photoelectric converter output processing system may output unreliable signals for the first few cycles of CCD outputs.

SUMMARY OF THE INVENTION

It is an object of embodiments of this invention to provide a device for generating reliable amplified effective CCD output values, even for the first effective CCD output cycle.

In order to achieve the above and other objects, embodiments of the invention include a photoelectric converter for converting light signals into electric output signals, a voltage storage device capable of storing a reference voltage, a voltage supply device that supplies a preset voltage, a control device that selectively couples the voltage supply device to the voltage storage device so that the voltage storage device is charged to the reference voltage when the photoelectric converter is generating a reset reference signal, and an amplifier coupled to the photoelectric converter and to the voltage storage device. The amplifier amplifies the photoelectric converter electric output signals based on the reference voltage stored in the voltage storage device. Thus, reliable CCD output amplification is achieved, starting with the first effective CCD sensor output.

BRIEF DESCRIPTION OF THE DRAWINGS

The invention will be described in detail with reference to the following drawings, wherein.

DETAILED DESCRIPTION OF PREFERRED EMBODIMENTS

Figure 1:
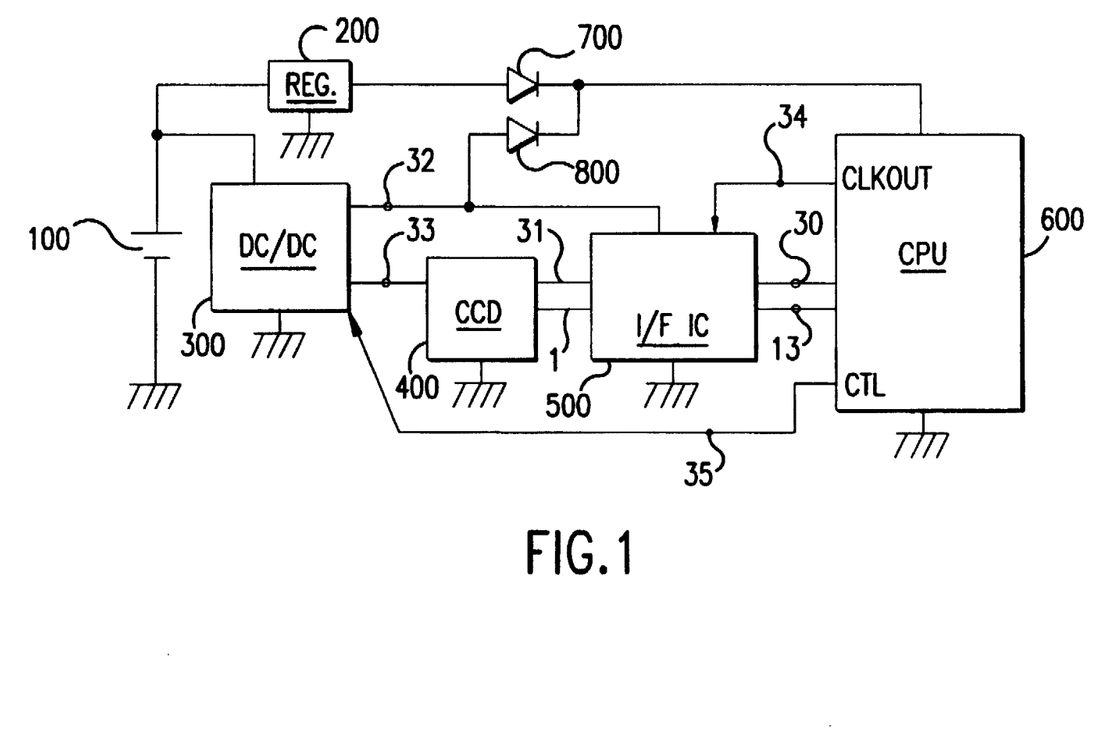
FIG. 1 is a block diagram of a preferred embodiment of the photoelectric converter output processing system of the invention.

A preferred embodiment of the photoelectric converter output processing system is shown in FIG. 1. A power source 100 supplies power to a regulator 200 and to a DC/DC converter 300. The regulator 200 supplies regulated power to the central processing unit (CPU) 600 through a diode 700. The DC/DC converter 300 supplies power to the CPU 600 through signal line 32 and through a diode 800. Power is also supplied through the signal line 32 to an interface-IC 500 and to the CCD 400 through a signal line 33.

The CPU 600 sends control signals to the interface-IC 500 through a signal line 34 and to the DC/DC converter 300 through a signal line 35. The interface-IC 500 sends control signals including a reset signal and a transfer clock signal to the CCD 400 through a signal line 31 while the CCD output signals are input to the interface-IC 500 through a signal line 1. The interface-IC 500 sends an amplified CCD output signal to the CPU 600 through a signal line 13 and sends analog-to-digital (A/D) conversion timing pulses to the CPU 600 through a signal line 30.

The CPU 600 controls the DC/DC converter 300 by placing a signal having either a logical HIGH or a logical LOW value (HIGH or LOW, respectively) on the signal line 35. When the signal on the signal line 35 is LOW, then the DC/DC converter 300 outputs power to the CPU 600 and to the interface-IC 500 through the signal line 32 and to the CCD 400 through the signal line 33. When the DC/DC converter 300 is outputting power, the diode 700 prevents the power of the DC/DC converter 300 from entering the regulator 200.

When the CPU 600 places a HIGH onto the signal line 35, the DC/DC converter 300 stops outputting power to the signal lines 32 and 33. Under this condition, the CPU 600 receives power from the regulator 200 through the diode 700, but the CCD 400 and the interface-IC 500 are without power. The diode 800 prevents the power supplied from the regulator 200 from entering the DC/DC converter 300.

Figure 2:
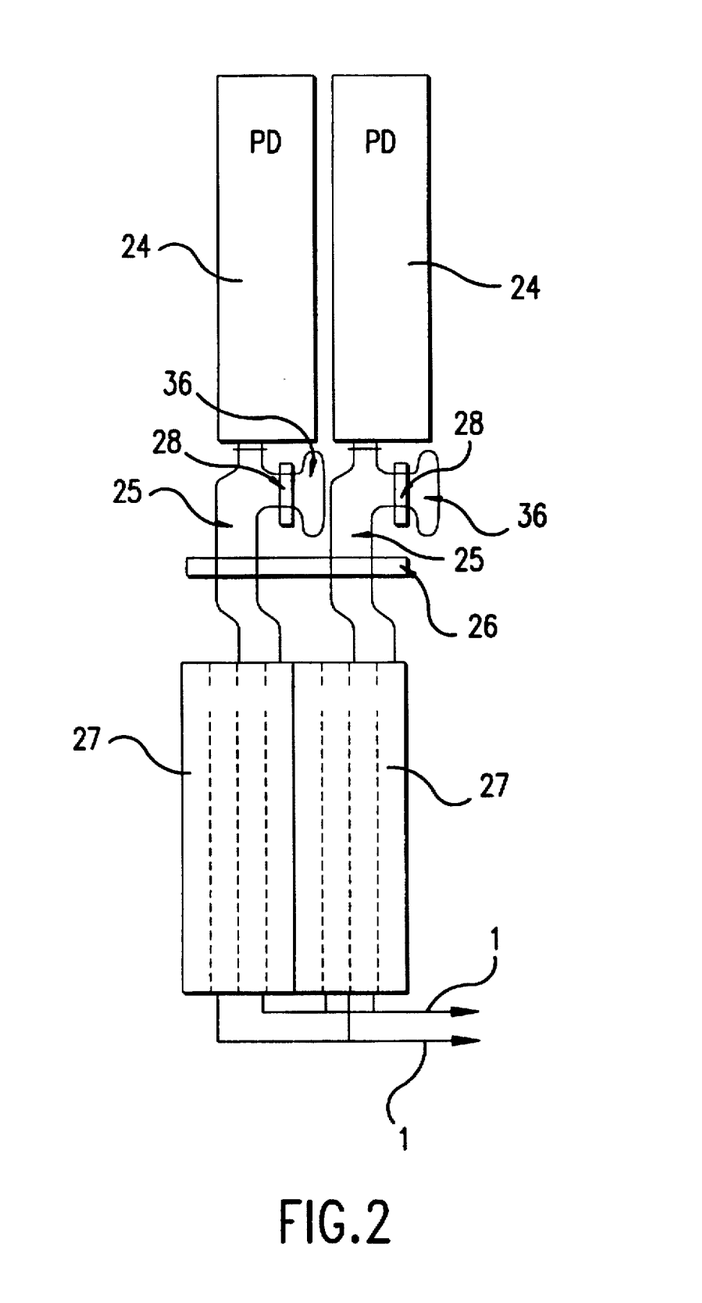
FIG. 2 is a block diagram of two CCD sensors.

FIG. 2 shows two adjacent CCD sensors 24 that convert the electron charges of the sensors into CCD output signals. The CCD sensors 24 are coupled to charge storage components 25. A clear gate 28 and a transfer gate 26 are coupled to each storage component 25. The transfer gates 26 control the transfer of charges to registers 27 and the clear gates 28 control the application of the output of 12 volt sources 36 to the storage components 25 to discard remaining electrons.

A charge storage cycle starts when the interface-IC 500 responds to a signal on the signal line 34 from the CPU 600 by sending a storage signal to the CCD 400 through the signal line 31 to close the clear gates 28. After the clear gates 28 are closed, each sensor 24 converts the intensity of the incident light energy into a corresponding electron charge value. The electron charges are stored in the storage component 25. When the charge in the storage component 25 reaches a proper value, the transfer gate 26 is opened, stopping further charges from being stored in the storage component 25 and transferring the charges stored in the storage component 25 into the register 27. When the charge-transfer to the register 27 from the storage component 25 is completed, the transfer gate 26 is closed and the clear gate 28 is opened. When the clear gate 28 is opened, the outputs of the 12 volt sources 36 are impressed into the storage components 25 to discard any remaining electrons. When all 220 CCD sensors output their respective charges, one charge storage cycle is completed.

In the preferred embodiment, the CCD has 220 sensors or cells aligned in a line. Each sensor represents one pixel. Nine pixels at each end are covered by aluminum shields producing dark current outputs.

Figure 3:
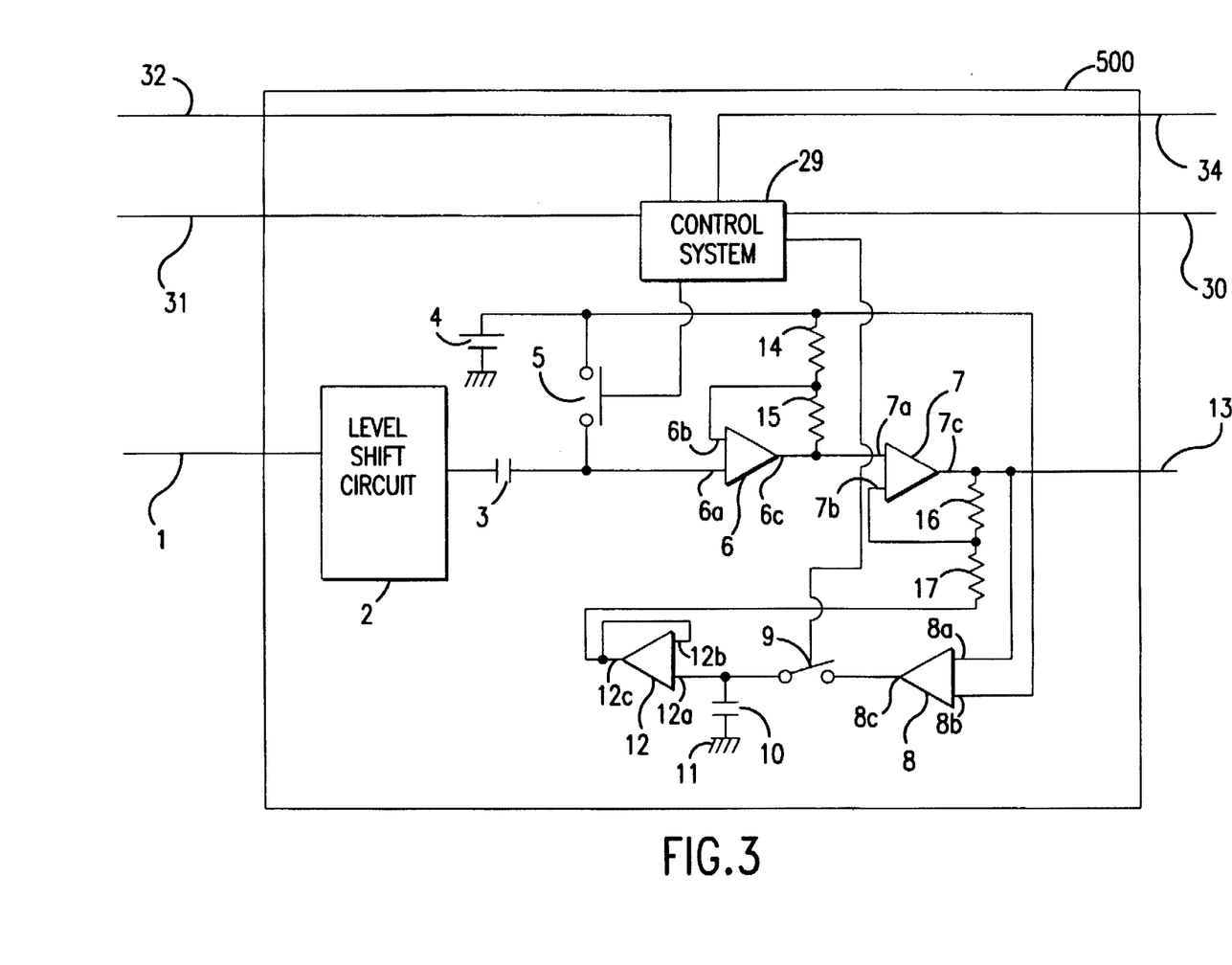
FIG. 3 is a schematic diagram showing the interface-IC of the FIG. 1 system.

FIG. 3 is a schematic diagram of the interface-IC 500 including a level shift circuit 2 receiving the output signal from the CCD 400 through a signal line 1. The level shift circuit 2 is connected to a clamp switch 5 and to a positive input terminal 6a of a first amplifier 6 through a capacitor 3. The clamp switch 5 is shown to be a switch in FIG. 3, but it can be any circuit that performs the same function. The output 6c of the first amplifier 6 is connected to a positive terminal 7a of a second amplifier 7. The output 7c of the second amplifier 7 is connected to the interface-IC output signal line 13 and to a buffer 8 at a positive input terminal 8a. The output 8c of the buffer 8 is connected to a first terminal of a sample hold capacitor 10 through a sampling switch 9. The sampling switch 9 can be, for example, a FET transistor. A second terminal of the sample hold capacitor 10 is connected to a fixed reference voltage 11. In this embodiment, the fixed reference voltage is ground. The first terminal of the sample hold capacitor 10 is connected to a positive terminal 12a of a buffer 12. The buffer output 12c is fed back to the negative terminal 12b of buffer 12 and to a negative input terminal 7b of the second amplifier 7 through a resister 17. The buffer 12 acts as an impedance converter to minimize the charge leakage out of the sample hold capacitor 10. The buffer 12 is an amplifier with unity gain and functions as a current amplifier. Thus, the output 12c of the buffer 12 supplies current necessary to set the voltage at the output 12c to be the same voltage as being input at the positive input terminal 12a of the buffer 12. Resisters 14 and 15 determine the gain of the first amplifier 6 and resisters 17 and 16 determine the gain of the second amplifier 7.

The amplifier 7, the buffer 8, the sampling switch 9, the buffer 12 and the resistors 16 and 17 form a closed loop. Since the output 7c of amplifier 7 is connected to the positive terminal 8a of the buffer 8, the output of the buffer 8 is connected to the positive terminal 12a of the buffer 12 through the sampling switch 9, and the output 12c of the buffer 12 is connected to the negative input terminal 7b of the amplifier 7 through resister 17, the closed loop is a negative feedback loop. A positive change in the voltage input at the terminal 8a, causes the output 7c of the amplifier 7 to go negative, counteracting the positive change. Thus, when the sampling switch 9 is closed, the output voltage of the amplifier 7 is maintained to a voltage value equal to the voltage value at the negative input terminal 8b of the buffer 8 by the closed loop. The capacitor 10 is set to the reference voltage value that serves as the reference voltage during the amplification of the CCD outputs when the sampling switch 9 is open.

The preset voltage source 4, having a preset voltage value, connects to the clamp switch 5, the positive input terminal 6a of the first amplifier 6 through the clamp switch 5, the negative input terminal 6b of first amplifier 6 through resister 14, and the negative input terminal 8b of the buffer 8. When the clamp switch 5 is closed and the level shift circuit 2 outputs a reset voltage, the capacitor 3 is charged to cancel any DC voltage difference between the output of the level shift circuit 2 and the preset voltage value. This allows any AC signals from the level shift circuit 2 to be directly input to the positive terminal 6a of the amplifier 6 when the clamp switch 5 is open.

The sample hold capacitor 10 is set to the preset voltage by closing the sampling switch 9. The positive input terminal 6a of the amplifier 6 is set to the preset voltage by the capacitor 3. The negative terminal 6b of the amplifier 6 is also connected to the preset voltage through resistors 14 and 15 setting the output 6c of the amplifier 6 to the preset voltage. Since the negative input terminal 8b of the buffer 8 is always connected to the preset voltage source 4, when the sampling switch 9 is closed, both the sample hold capacitor 10 and the output 7c of the second amplifier 7 are set substantially to the preset voltage value. If the sample hold capacitor 10 has any value other than the preset voltage, a voltage difference will appear across resistors 16 and 17. This voltage difference will cause the closed loop to change the amount of charge stored in the sample hold capacitor 10 until the voltage difference is substantially zero. Thus, the capacitor 10 is set to the preset voltage.

Of course, the capacitor 10 can be set to a value different from the preset voltage value by adding feedback resistors to the buffer 12 feedback path, adding resistor dividers to inputs of the buffer 8 or other similar means.

After the capacitor 10 is set to the preset voltage the sampling switch 9 is opened, the output 7c of the amplifier 7 is simply the voltage at the positive input terminal 6a of the amplifier 6 in excess of the preset voltage, multiplied by the amplification ratios of the first and second amplifiers 6 and 7. The total amplification factor is positive because the output of the CCD 400 is input into the positive terminal 6a of the amplifier 6 and the output 6c of amplifier 6 is input to the positive terminal of the amplifier 7. Thus, the output 7c of the amplifier 7 is the CCD 400 output amplified. If the sampling switch 9 is closed when a signal is applied to the positive input terminal 6a of the amplifier 6, then the voltage of the sample hold capacitor 10 is set to the output voltage of the second amplifier 7 by the operation of the closed loop.

The interface-IC 500 also includes a control system 29. The control system 29 sends A/D conversion timing pulses to the CPU 600 through the signal line 30. Concurrently, the control system 29 sends transfer clock signals to the CCD 400 through the signal line 31. The A/D conversion timing pulses and the transfer clock signals have the same intervals. The control system 29 also controls the opening and closing of the clamp switch 5 and the sampling switch 9.

In a camera application where the output of the interface-IC 500 is used to compute automatic focussing by the CPU 600, a half-depression switch of the camera begins the CCD output process. Before the automatic focussing process is started, the DC/DC converter 300 is not supplying power and the CPU 600 is powered by the regulator 200. The CCD 400 and the interface-IC 500 are without power. A logic circuit, a flip-flop for this embodiment, of the control system 29 within the interface-IC 500 is in a reset state when no power is supplied. When the half-depression switch is depressed, the CPU 600 places a LOW signal on signal line 35. This causes the DC/DC converter 300 to begin supplying power to the CCD 400, the interface-IC 500 and the CPU 600. When the interface-IC 500 receives power, the logic circuit of the control system 29 is released, which in turn activates the control system 29. Then, the control system 29 sends a reset signal to the CCD 400. The CCD 400 responds by outputting a reset reference signal to the level shift circuit 2 which in turn outputs the reset voltage. The control system 29 then charges the capacitor 3 by closing the clamp switch 5. The control system 29 also closes the sampling switch 9 for a fixed interval causing the sample hold capacitor 10 to be set to the preset voltage.

When the control system 29 receives the control signal from the CPU 600 through the signal line 34, the control system 29 starts the CCD charge storage cycle by sending the storage signal to the CCD 400 on the signal line 31. Then the control system 29 sends the transfer clock signals to the CCD 400 through the signal line 31 and the A/D conversion timing pulses to the CPU 600 through the signal line 30. Since there are 220 CCD sensors for this embodiment, there are 220 A/D conversion timing pulses and transfer clocks. With each transfer clock, the charge corresponding to one of the 220 CCD sensors stored in the corresponding register 27 is output to the signal line 1. The charge value corresponding to each pixel is output one at a time in a bucket relay method upon successive transfer clocks.

Figure 4:
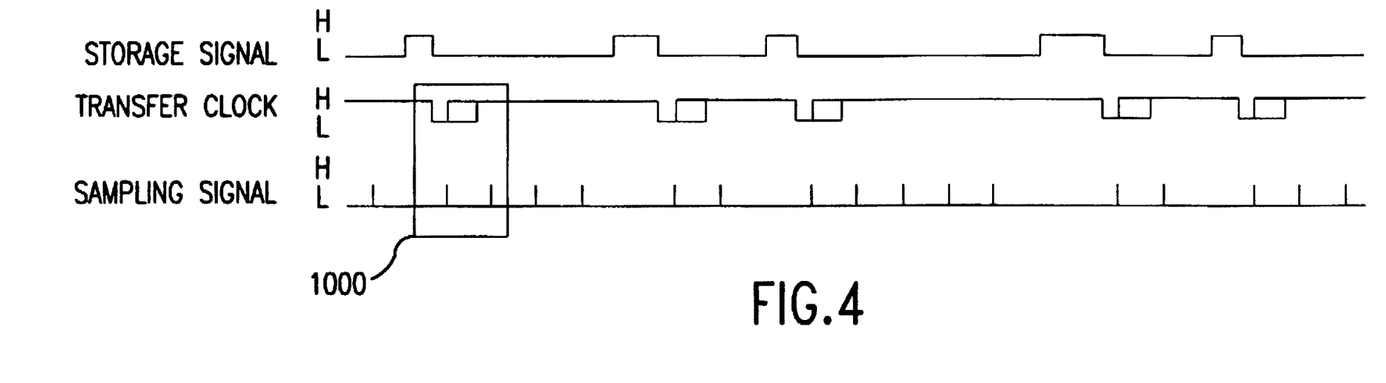
FIG. 4 is a timing chart showing the transfer clocks and sampling signals of the preferred embodiment relative to each CCD cycle.

FIG. 4 shows a waveform diagram of the storage signal, the transfer clock and the sampling signal. The block 1000 is expanded in FIG. 5. The transfer clock remains at a logical HIGH when the CCD 400 is not generating any outputs. The control system 29 sets the transfer clock to a logical LOW before the first CCD output. On the first transfer clock, t=1, the CCD output value corresponding to the charge of the first CCD sensor is output to the signal line 1. On t=2, the charge corresponding to the second CCD sensor is output and so on for all 220 CCD sensors. This sequence occurs as long as the half-depression switch is depressed.

Figure 6:
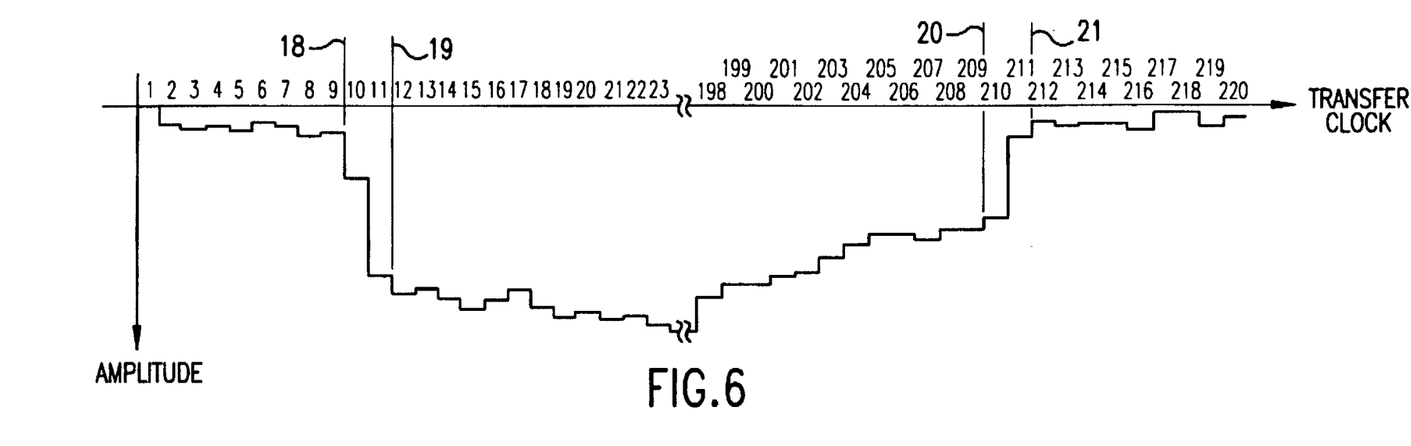
FIG. 6 is a diagram showing the output signals of the CCD.
Figure 7:
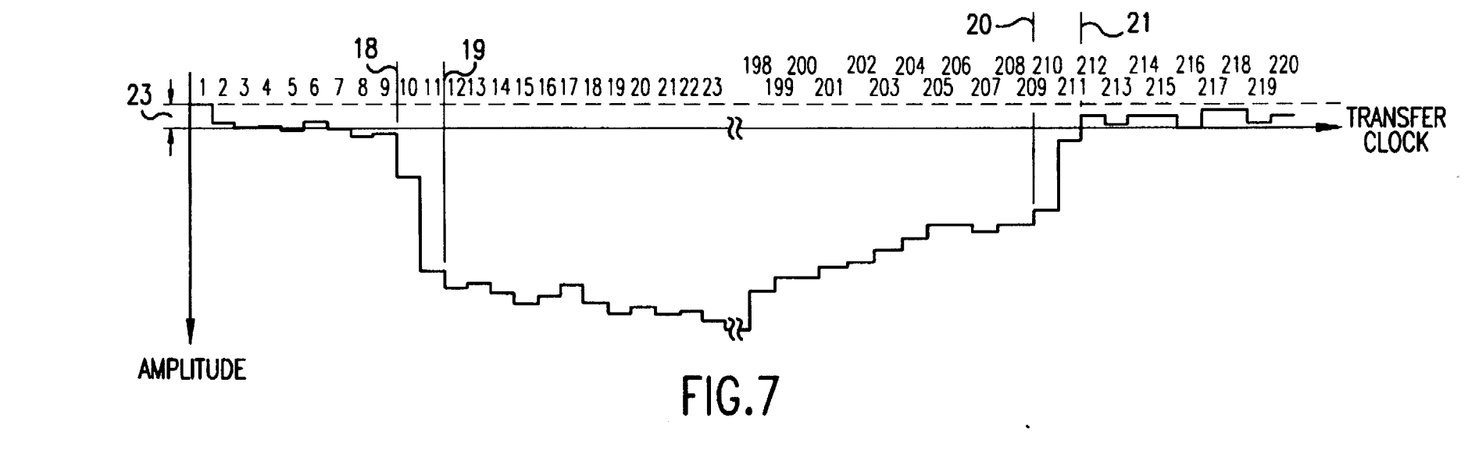
FIG. 7 is a diagram showing the output of the amplifier of the FIG. 1 system.

FIG. 6 shows an example of the CCD output waveform. The horizontal axis is the time in transfer clock units and the vertical axis is the amplitude. FIG. 7 shows an example of the output 7c of the amplifier 7. There are 220 CCD sensors, one CCD sensor output is transferred for each transfer clock. Nine sensors at each end of the CCD are covered by the aluminum shields. These sensors correspond to the CCD outputs to the left of line 18 and to the right of line 21. Thus, the CCD outputs for transfer clocks t=1 through t=9 and t=212 through t=220 are the dark current outputs. Two sensors on each end are partially shielded by the aluminum shields. These sensors correspond to CCD outputs between lines 18, 19 and 20, 21. The output values of these sensors are transferred at transfer clocks t=10, t=11, t=210 and t=211. The CCD outputs between lines 19 and 20 correspond to the effective CCD sensors. Thus, the output values of the effective sensors are transferred at transfer clocks t=12 through t=209. The amplifier 7 outputs are offset by the voltage equivalent of the dark current outputs shown as the gap 23.

The control system 29 first sends the reset signal to the CCD 400 and closes the clamp switch 5 to charge the capacitor 3 to remove the DC voltage difference between the level shift circuit 2 output and the preset voltage. Then the control system 29 opens the clamp switch 5 and sends the transfer clocks to the CCD 400 through the signal line 31. In response to the transfer clocks, the CCD 400 outputs the sensor charge values and the voltage equivalents of the sensor charge values are input to the positive input terminal 6a of the amplifier 6 through the capacitor 3. The amplifiers 6 and 7 amplify the CCD output signals. The amplifier 7 outputs the amplified CCD outputs to the CPU 600 through the signal line 13.

Figure 5:
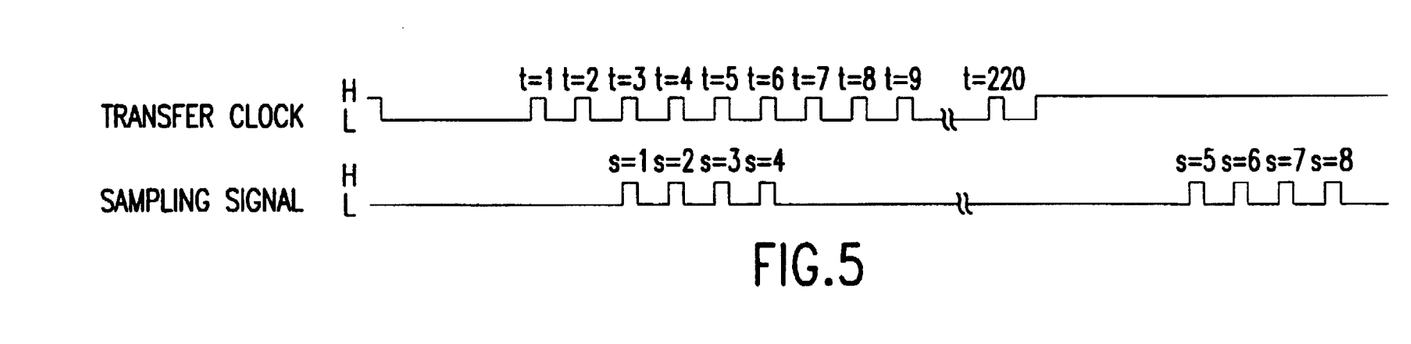
FIG. 5 is an expanded view of a portion of one CCD cycle of FIG. 4.

The control system 29 also generates sampling signals during selected transfer clocks. FIG. 5 shows two sets of sampling signals. A first set of sampling signals, s=1 through s=4, correspond to transfer clocks t=3 through t=6, respectively and a second set of sampling signals s=5 through s=8 occur when the transfer clock remains HIGH (i.e., between CCD cycles-when the CCD is not generating output signals). When the sampling signal is at a logical HIGH, the sampling switch 9 is closed. Closing the sampling switch 9 causes the sample hold capacitor 10 to be set to the reference value when the output value of the second amplifier 7 is equal to the preset voltage value. Thus, for the first set of the sampling signals, s=1 through s=4, the second amplifier output corresponding to dark current outputs from the CCD transferred by transfer clocks t=3 through t=6 is sampled at least for each charge storage cycle of the CCD 400. In the present embodiment, although there are nine dark pixels, only the dark current outputs from four of the nine dark pixels are used. The dark pixels located near the ends are not used because the dark current output values of these dark pixels are not as reliable as the intermediate dark pixels.

The control system 29 opens the sampling switch 9 after the s=4 sampling signal. The voltage that is held by the sample hold capacitor 10 is the sampled voltage of the dark current outputs. The output 12c of the buffer 12 outputs the sampled voltage to the resistor 17 so that the amplifier 7 amplifies subsequent CCD outputs corresponding to transfer clocks t=7 through t=220 using the sampled voltage as a reference voltage.

The sampled voltage that is held by the sample hold capacitor 10 is set by the buffer 8. Since the negative input 8b of the buffer 8 is held to the preset voltage from preset voltage source 4, the output 7c of the second amplifier 7 is set to the preset voltage during the sampling signals s=1 through s=4. Thus, when the CCD outputs corresponding to the dark pixels are sampled, the output 7c of the second amplifier 7 is set to the preset voltage value.

Although the sampling signals (which close sampling switch 9 to apply a charge to capacitor 10) occur in regular intervals in the present embodiment, the sampling signals can be output at random intervals. The control system 29 can output sampling signals based on a random function. Thus, instead of generating sampling signals only when the transfer clocks are generated and the CCD 400 is generating outputs, sampling signals can occur at other random intervals when the CCD 400 is not generating outputs. The second set of sampling signals s=5 through s=8, shown in FIG. 5, is an example of sampling signals generated when the transfer clocks are not present.

Figure 8:
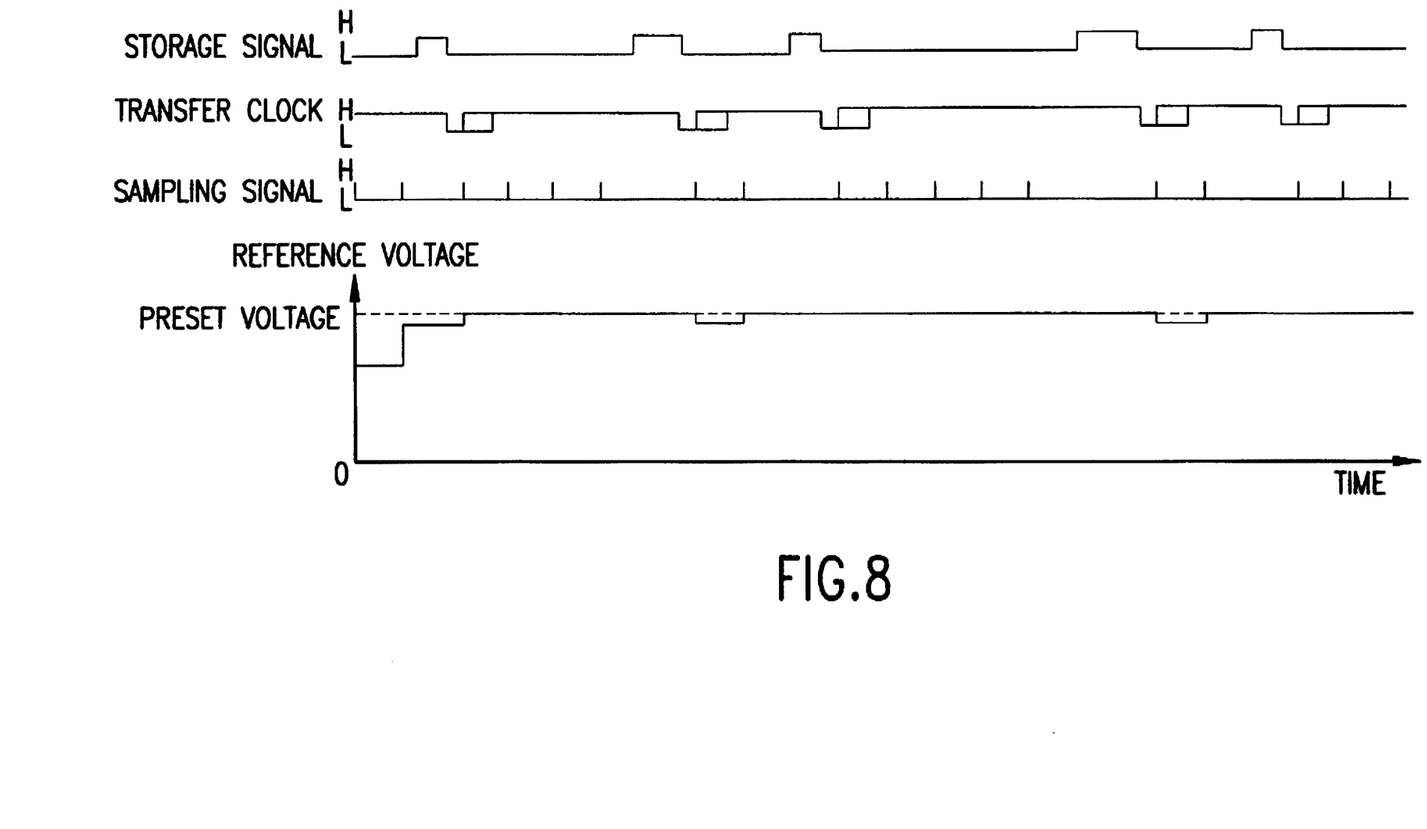
FIG. 8 is a waveform diagram of the reference voltage stored in the voltage storage device of the preferred embodiment relative to each CCD cycle.

FIG. 8 shows an example of a waveform of the reference voltage where sampling signals are output at random intervals. The sample hold capacitor 10 is set to the preset voltage, indicated by the dotted line, by the control system 29. During the first two sets (cycles) of sampling signals, the CCD has not generated any outputs. Thus the reference voltage is set to a value dictated by the capacitor 3 and the level shift circuit 2. Since the sample hold capacitor 10 is precharged to the preset voltage value when the interface-IC 500 first received power, the buffer 8 can easily charge the sample hold capacitor 10 to the desired voltage even for the first set of sampling signals. Thus, the interface-IC 500 generates reliable outputs starting with the first effective CCD output.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A photoelectric converter output processing system, comprising:

a photoelectric converter that converts light signals into electric output signals;

a voltage storage device capable of storing a reference voltage;

a voltage supply device that supplies a preset voltage;

a control device that controls the photoelectric converter output processing system, the control device selectively coupling the voltage supply device to the voltage storage device so that the voltage storage device is charged to the reference voltage, the control device coupling the voltage supply device to the voltage storage device while the photoelectric converter is generating a reset reference signal;

an amplifier coupled to the photoelectric converter and the voltage storage device, the amplifier amplifying the photoelectric converter electric output signals based on the reference voltage stored in the voltage storage device; and a power source, the power source being coupled to the control device and placing the control device in an operative condition when the power source supplies power to the control device, wherein after receiving power from the power source, and before the photoelectric converter begins generating the electric output signals, the control device sends a signal to the voltage supply device to supply the preset voltage to the voltage storage device.

2. The photoelectric converter output processing system of claim 1, further comprising a switch between the voltage supply device and the voltage storage device, wherein the control device couples the voltage supply device with the voltage storage device by closing the switch.

3. The photoelectric converter output processing system of claim 2, wherein the control device closes the switch at random intervals, at least some of the random intervals occurring during periods when the photoelectric converter is not outputting electric output signals.

4. The photoelectric converter output processing system of claim 2, wherein the control device closes the switch at fixed intervals.

5. The photoelectric converter output processing system of claim 1, further comprising an impedance converter that has a high impedance input terminal and a low impedance output terminal, wherein the high impedance input terminal of the impedance converter is coupled to the voltage storage device preventing the voltage storage device from discharging by isolating the voltage storage device from a direct connection to the amplifier, and the low impedance output terminal of the impedance converter is coupled to the amplifier outputting the reference voltage of the voltage storage device to the amplifier.

6. The photoelectric converter output processing system of claim 5, wherein the impedance converter is comprised of a buffer.

7. The photoelectric converter output processing system of claim 1, wherein the control device comprises a logic circuit, the logic circuit being released after the power source supplies power to the control device and activating the control device after the logic circuit is released.

8. The photoelectric converter output processing system of claim 1, wherein the preset voltage of the voltage supply device has a different value than the reference voltage of the voltage storage device.

9. The photoelectric converter output processing system of claim 1, wherein the photoelectric converter is comprised of charged-coupled-device sensors.

10. The photoelectric converter output processing system of claim 1, wherein the voltage storage device is comprised of a capacitor.

11. The photoelectric converter output processing system of claim 1, wherein the photoelectric converter generates electric output signals that are data signals for a camera focus device.

12. The photoelectric converter output processing system of claim 1, wherein the photoelectric converter generates a plurality of dark current outputs having substantially equal voltage values.

13. The photoelectric converter output processing system of claim 1, wherein the preset voltage of the voltage supply device is a constant voltage.

14. The photoelectric converter output processing system of claim 1, wherein the photoelectric converter comprises light shielded sensors, the light shielded sensors generating dark current outputs having corresponding voltage values, wherein the control device couples the voltage values corresponding to the dark current outputs to the voltage storage device by closing a switch.

15. A method for processing photoelectric converter outputs, comprising the steps of:

(a) supplying power from a power source to a control device and thereafter the control device sending a signal to a voltage supply device to supply a preset voltage to a voltage storage device;

(b) setting the voltage storage device substantially to the preset voltage supplied by the voltage supply device while the photoelectric converter outputs a reset reference signal;

(c) outputting photoelectric converter output signals generated by a photoelectric converter corresponding to dark current outputs of shielded light sensors;

(d) setting the voltage storage device to a reference voltage corresponding to the dark current outputs of the photoelectric converter;

(e) outputting photoelectric converter outputs corresponding to current outputs of effective light sensors; and (f) amplifying the current outputs of effective light sensors based on the reference voltage set in the voltage storage device.

16. The method for processing photoelectric converter outputs of claim 15, wherein step (b) further comprises the steps of:

(i) placing the control device into an operating state;

(ii) closing a switch using the control device to couple the voltage supply device to the voltage storage device; and (iii) opening the switch using the control device so that the voltage supply device is decoupled from the voltage storage device.

17. The method for processing photoelectric converter outputs of claim 16, wherein step (i) includes:

releasing a logic circuit of the control device; and activating the control device to control the switch.

18. The method for processing photoelectric converter outputs of claim 15, further comprising the step of closing a switch that couples the voltage storage device with the voltage supply device in random intervals when the photoelectric converter is not generating output signals.

19. The method for processing photoelectric converter outputs of claim 15, further comprising the step of closing a switch that couples the voltage storage device with the voltage supply device in fixed intervals.

20. A photoelectric converter output processing system, comprising:

a photoelectric converter that converts light signals into electric output signals;

a voltage storage device capable of storing a reference voltage;

a voltage supply device that supplies a preset voltage;

a control device that controls the photoelectric converter output processing system, the control device comprising a logic circuit, the control device selectively coupling the voltage supply device to the voltage storage device so that the voltage storage device is charged to the reference voltage, the control device coupling the voltage supply device to the voltage storage device while the photoelectric converter is generating a reset reference signal;

an amplifier coupled to the photoelectric converter and the voltage storage device, the amplifier amplifying the photoelectric converter electric output signals based on the reference voltage stored in the voltage storage device; and a power source, the power source being coupled to the control device and placing the control device in an operative condition when the power source supplies power to the control device, wherein after receiving power from the power source, and before the photoelectric converter begins generating the electric output signals, the control device sends a signal to the voltage supply device to supply the preset voltage to the voltage storage device and wherein the logic circuit is released after the power source supplies power to the control device and activates the control device.

* * * * *